United States Patent
Barth et al.

(10) Patent No.: US 7,181,561 B2
(45) Date of Patent: Feb. 20, 2007

(54) ORDERING RULE CONTROLLED COMMAND STORAGE

(75) Inventors: Frank Barth, Radebeul (DE); Thomas Kunjan, Dresden (DE)

(73) Assignee: Advanced Micro Devices, Inc., Sunnyvale, CA (US)

( * ) Notice: Subject to any disclaimer, the term of this patent is extended or adjusted under 35 U.S.C. 154(b) by 319 days.

(21) Appl. No.: 10/465,014

(22) Filed: Jun. 19, 2003

(65) Prior Publication Data

US 2004/0107306 A1 Jun. 3, 2004

(30) Foreign Application Priority Data

Nov. 29, 2002 (DE) .............................. 102 55 937

(51) Int. Cl.
 G06F 13/14 (2006.01)
 G06F 13/42 (2006.01)
 G06F 5/00 (2006.01)
 G06F 13/36 (2006.01)

(52) U.S. Cl. ....................... 710/310; 710/39; 710/52

(58) Field of Classification Search ................ 710/310, 710/39, 6, 52–57
See application file for complete search history.

(56) References Cited

U.S. PATENT DOCUMENTS

| | | | |
|---|---|---|---|
| 5,768,548 A | | 6/1998 | Young et al. |
| 6,101,568 A * | | 8/2000 | Richardson ................. 710/310 |
| 6,112,265 A * | | 8/2000 | Harriman et al. ............. 710/40 |
| 6,205,506 B1 * | | 3/2001 | Richardson ................. 710/310 |
| 6,243,781 B1 * | | 6/2001 | Gandhi et al. .............. 710/313 |
| 6,356,972 B1 * | | 3/2002 | Chin et al. .................. 710/310 |
| 6,442,631 B1 * | | 8/2002 | Neufeld et al. ............. 710/107 |
| 6,487,615 B1 * | 11/2002 | Hunsaker ..................... 710/52 |
| 6,601,117 B1 * | 7/2003 | Dahlen et al. ................ 710/52 |
| 6,618,354 B1 * | 9/2003 | Sharma ...................... 370/229 |
| 6,694,390 B1 * | 2/2004 | Bogin et al. .................. 710/53 |
| 6,732,242 B2 * | 5/2004 | Hill et al. ................... 711/158 |
| 6,757,768 B1 * | 6/2004 | Potter et al. ................ 710/112 |

(Continued)

FOREIGN PATENT DOCUMENTS

DE 69326066 2/1993

(Continued)

OTHER PUBLICATIONS

Cormen et al.;"Introduction to Algorithms"; 1991; The MIT Press; Third printing; pp. 149-150, 200-213.*

(Continued)

*Primary Examiner*—Rehana Perveen
*Assistant Examiner*—Ryan Stiglic
(74) *Attorney, Agent, or Firm*—Meyertons Hood Kivlin Kowert & Goetzel, PC; B. Noël Kivlin (57) ABSTRACT

A command storage technique that fulfils ordering rules is provided. This technique may be used in HyperTransport compliant southbridge devices. A command transmit engine comprises a command storage unit that is adapted to receive incoming commands of different command types and store the command in the order in which the commands were received. The command transmit engine further comprises an ordering rule controller that is connected to the command storage unit to select stored commands to be transmitted. The ordering rule controller is adapted to perform the selection according to predefined command ordering rules. The command ordering rules are command type dependent.

57 Claims, 3 Drawing Sheets

U.S. PATENT DOCUMENTS

| | | | |
|---|---|---|---|
| 6,760,793 B2 * | 7/2004 | Kelley et al. | 710/52 |
| 6,834,314 B1 * | 12/2004 | Askar | 710/5 |
| 6,862,673 B2 * | 3/2005 | Lee et al. | 711/169 |
| 7,072,342 B1 * | 7/2006 | Elnathan | 370/394 |
| 2003/0046475 A1 * | 3/2003 | Black et al. | 710/310 |
| 2004/0019729 A1 * | 1/2004 | Kelley et al. | 710/306 |
| 2004/0024947 A1 | 2/2004 | Barth et al. | |
| 2004/0024948 A1 | 2/2004 | Winkler et al. | |

FOREIGN PATENT DOCUMENTS

WO     00/77624     12/2000

OTHER PUBLICATIONS

English translation of Official Communication Issued Apr. 21, 2004 for German application No. 10255937.6-53.

* cited by examiner

ORDERING RULE CONTROLLED COMMAND STORAGE

BACKGROUND OF THE INVENTION

1. Field of the Invention

The invention generally relates to southbridges and corresponding integrated circuit chips, computer systems and methods, and in particular to the implementation of ordering rules when transmitting commands of different types.

2. Description of the Related Art

Integrated circuit chips are often used for data processing and are known to comprise a number of different circuit units. Generally, each circuit unit is for performing a specific function and of course, there may be different circuit units provided on one chip for performing the same function, or performing different functions. The circuit units may operate sequentially in time or simultaneously, and they may function independently from each other, or dependent on the operation of other circuit units.

In the latter case, the circuit units are usually interconnected via an interface to allow the circuit units to interchange data needed for making the operation of one circuit unit dependent on the operation of the other circuit unit. The data exchange is often done by sending transactions from one circuit unit to the other circuit unit. A transaction is a sequence of packets that are exchanged between the circuit units and that result in a transfer of information. The circuit unit initiating a transaction is called the source (or master), and the circuit unit that ultimately services the transaction on behalf of the source is called target. It is to be noted that there may also be intermediary units between the source and the target.

Transactions may be used to place a request, or to respond to a received request. Taking the requests, there may be distinguished posted request from non-posted requests, dependent on whether the request requires a response. Specifically, a non-posted request is a request that requires a response while a posted request does not require a response.

When focusing on the functions which are performed by the interconnected circuit units, the circuit units can often be divided into hosts and devices. The term host then means a circuit unit that provides services to the dependent device. A transaction from the host to the device is said to be downstream while a transaction in the other direction is said to be upstream. In bi-directional configurations, both the host and the device may send and receive requests and responses so that a device may be source as well as target, and also the host may function as source or target.

Figure 1:
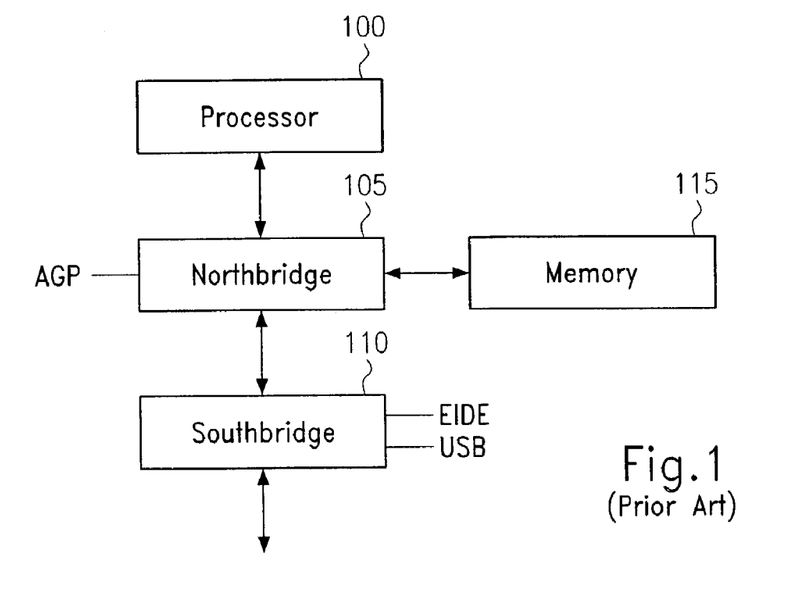
FIG. 1 is a block diagram illustrating schematically the hardware components of a conventional computer system.

A field where such integrated circuit chips are widely used are personal computers. Referring to FIG. 1, the hardware components of a common motherboard layout are depicted. It is to be noted that this figures shows only one example of a motherboard layout, and other configurations exist as well. The basic elements found on the motherboard of FIG. 1 may include the CPU (Central Processing Unit) 100, a northbridge 105, a southbridge 110, and system memory 115.

The northbridge 105 is usually a single chip in a core-logic chipset that connects the processor 100 to the system memory 115 and, e.g., to the AGP (Accelerated Graphic Port) and PCI (Peripheral Component Interface) buses. The PCI bus is commonly used in personal computers for providing a data path between the processor 100 and peripheral devices like video cards, sound cards, network interface cards and modems. The AGP bus is a high-speed graphic expansion bus that directly connects the display adapter and system memory 115. AGP operates independently of the PCI bus. It is to be noted that other motherboard layouts exist that have no northbridge in it, or that have a northbridge without AGP or PCI options.

The southbridge 110 is usually the chip in a system core-logic chipset that controls the IDE (Integrated Drive Electronics) or EIDE (Enhanced IDE) bus, controls a USB (Universal Serial Bus) bus that provides plug-and-play support, controls a PCI-ISA (Industry Standard Architecture) bridge, manages the keyboard/mouse controller, provides power management features, and controls other peripherals.

Thus, common personal computers include southbridges 110 which are integrated circuit chips substantially as described above. Conventionally, the southbridge 110 and the northbridge 105 are interconnected by the PCI bus acting as system bus so that the northbridge 105 works as host-to-PCI bridge forming a link between the host bus that connects to the processor 100, and the PCI bus whereas the southbridge 110 works as, e.g., PCI-to-ISA bus where the ISA (Industry Standard Architecture) bus is the I/O bus. However, other chipset arrangements exist in which the northbridge 105 operates as memory controller hub and the southbridge 110 as I/O controller hub. In such structures, the northbridge 105 and the southbridge 110 are no longer interconnected by a system bus but by a specific hub interface.

To satisfy the demands for high-speed chip-to-chip communication in such hub interfaces, the HyperTransport™ technology was developed which provides a high-speed, high-performance point-to-point on-board link for interconnecting integrated circuits on a motherboard. It can be significantly faster than a PCI bus for an equivalent number of pins. The HyperTransport technology is designed to provide significantly more bandwidth than current technologies, to use low-latency responses, to provide low pin count, to be compatible with legacy computer buses, to be extensible to new system network architecture buses, to be transparent to operating systems, and to offer little impact on peripheral drivers.

Figure 2:
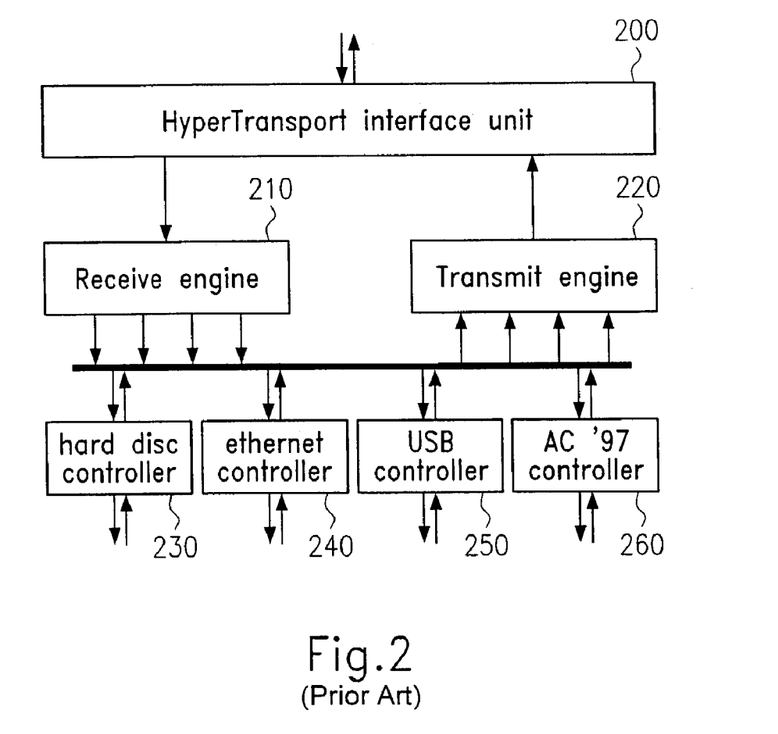
FIG. 2 illustrates the components of a conventional southbridge or I/O hub.

The hardware components of a HyperTransport compliant southbridge device (or I/O hub) is depicted in FIG. 2. A number of bus masters 230–260 are provided for controlling peripheral system components. The controllers may for instance include a hard disk controller 230, an ethernet controller 240, a USB (Universal Serial Bus) controller 250, and an AC (Audio Codec) '97 controller 260. These controllers act as bus masters to interact with a transmit engine 220 and a receive engine 210 of the device. The transmit engine 220 receives requests from the controllers 230–260 and performs an arbitration to select at any one time one of the requestors 230–260. Based on the received requests, the transmit engine 220 sends commands to the HyperTransport interface unit 200 that interfaces to a HyperTransport compliant link. Received responses are supplied from the HyperTransport interface unit 200 to the receive engine 210 where the responses are forwarded to the respective controllers 230–260 that were the originators of the requests. Thus, the HyperTransport interface is a split transaction interface, i.e., requests and responses are transferred on the bus as completely decoupled and independent transactions.

The HyperTransport specification defines three types of command packets: posted commands, non-posted commands, and responses. Ordering rules are defined for all types of I/O traffic. Ordered operations that return responses (reads or non-posted writes) are required to complete at the target in the correct order, and all I/O devices must be able to accept responses out of order or restrict themselves to one outstanding non-posted request. A bridge that is between a HyperTransport technology device and an I/O protocol that requires responses to be returned in order must provide sufficient buffering to be able to reorder as many responses as it may have outstanding requests.

As mentioned above, the HyperTransport technology recognizes three types of traffic: posted requests, non-posted requests, and responses, each in a separate virtual channel. These three types of traffic can be distinguished by their command encoding. Requests and responses both have a May Pass Posted Writes (PassPW) bit. The packet ordering rules can then be summarized by:

| Row Pass Column? | Posted Request | Non-posted Request | Response |
| --- | --- | --- | --- |
| Posted request | PassPW: Yes/No !PassPW: No | Yes | Yes |
| Non-posted Request | PassPW: Yes/No !PassPW: No | Yes/No | Yes/No |
| Response | PassPW: Yes/No !PassPW: No | Yes | Yes/No |

In the table, "No" indicates the subsequently issued transaction is not allowed to complete before the previous transaction. "Yes" indicates the subsequently issued transaction must be able to pass the previous transaction, and the packet type given in the column cannot be permitted to block the packet type given in the row at any point in the HyperTransport fabric or host. "Yes/No" indicates the subsequently issued transaction may optionally be allowed to complete before the previous transaction if there is any advantage to doing so. In this case, there are no ordering requirements between the two transactions. However, support for reordering is not required and failure to reorder the packets will not lead to deadlock.

Since therefore, different command types have to fulfil different rules, the most common way to implement the HyperTransport technology ordering rules is to provide multiple buffers which are each dedicated to one of the command types. This makes it easy to obtain the next command to be transmitted simply by selecting the respective buffer and reading out the first command in that buffer. However, this approach has some disadvantages.

One problem with this prior art scheme is that each time a command is received, its command type needs to be determined. Thus, a type detection is to be performed at the time of buffering the command, in order to determine the buffer to which the command is to be written. This is rather inefficient and reduces the overall operation speed.

A further problem with separate buffers is that the buffers require a significant amount of total buffer space to be sure that the buffers do not run empty. Thus, conventional circuits used to fulfil the command ordering rules are large in size and lead to high circuit development and manufacturing costs. Moreover, the prior art approaches are disadvantageous since they reduce the design robustness what makes it difficult to verify the design.

Besides the HyperTransport technology, other interface techniques exist where commands of different types are transmitted in a manner so as to fulfil certain ordering rules. These interface techniques have the same or similar problems as described above with respect to the HyperTransport technology.

SUMMARY OF THE INVENTION

An improved command storage technique that may deal with command ordering rules is provided that may be of improved efficiency and increased operating speed.

In one embodiment, a southbridge device having a command transmit engine that is adapted to transmit commands of different command types is provided. The command transmit engine comprises a command storage unit that is adapted to receive incoming commands of different command types and store the commands in the order in which the commands were received. The command transmit engine further comprises an ordering rule controller that is connected to the command storage unit to select stored commands to be transmitted. The ordering rule controller is adapted to perform the selection according to predefined command ordering rules. The command ordering rules are command type dependent.

In another embodiment, there may be provided an integrated circuit chip that comprises a command storage circuit that is adapted to receive incoming commands of different command types and store the commands in the order in which the commands were received. The integrated circuit chip further comprises an ordering rule control circuit that is connected to the command storage circuit to select stored commands to be output. The ordering rule control circuit is adapted to perform the selection according to predefined command ordering rules. The command ordering rules are command type dependent.

In still another embodiment, a computer system comprises at least one peripheral component and a southbridge that has a command transmit engine that is adapted to transmit commands of different command types. The command transmit engine comprises a command storage unit that is adapted to receive incoming commands of different command types from at least one control unit of the at least one peripheral component. The command storage unit stores the commands in the order in which the commands were received. The command transmit engine further comprises an ordering rule controller that is connected to the command storage unit to select stored commands to be transmitted. The ordering rule controller is adapted to perform the selection according to predefined command ordering rules. The command ordering rules are command type dependent.

In a further embodiment, there is provided a method of operating a southbridge device. The method comprises receiving commands of different command types, storing the commands in the order in which the commands were received, selecting stored commands to be transmitted by applying predefined command ordering rules that are command type dependent, and transmitting the selected commands.

BRIEF DESCRIPTION OF THE DRAWINGS

The accompanying drawings are incorporated into and form a part of the specification for the purpose of explaining the principles of the invention. The drawings are not to be construed as limiting the invention to only the illustrated and described examples of how the invention can be made and used. Further features and advantages will become apparent from the following and more particular description of the invention, as illustrated in the accompanying drawings, wherein.

DETAILED DESCRIPTION OF THE INVENTION

The illustrative embodiments of the present invention will be described with reference to the figure drawings wherein like elements and structures are indicated by like reference numbers.

Figure 3:
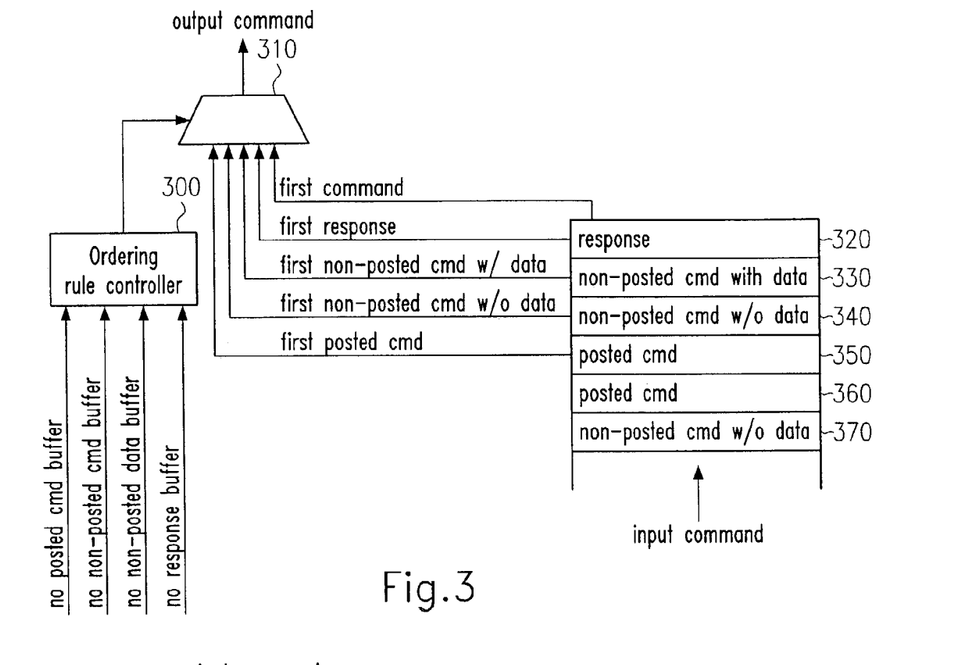
FIG. 3 is a schematic diagram illustrating the command queue mechanism according to an embodiment.

Referring now to the drawings and in particular to FIG. 3, the command queue mechanism according to an embodiment is depicted. A sequence of storage elements 320–370 is provided to store the commands in the order in which the commands were received. In the embodiment of FIG. 3, the storage element 320 stores a response, the elements 330, 340 and 370 store non-posted commands, and the elements 350 and 360 store posted commands. As can be seen from FIG. 3, non-posted commands with data are distinguished from non-posted commands without data.

The embodiment of FIG. 3 further comprises a multiplexer 310 that has multiple input terminals for receiving the first command, i.e., the command stored in element 320 irrespective of the type of this command, and the first response, the first posted command, and the first non-posted commands with and without data.

The multiplexer 310 is controlled by ordering rule controller 300 to select one of its input terminals and output the respective command to an upstream recipient.

While not restricted to the embodiment of a HyperTransport compliant command queue, the circuit of FIG. 3 supports the following ordering rules: neither posted nor non-posted commands nor responses are allowed to pass posted commands but posted commands may pass responses and non-post commands in cases when non-posted commands or responses cannot be transferred. Non-posted commands or responses cannot pass posted commands but can pass each other and can be passed by posted commands. That is: Posted commands are allowed to pass non-posted commands; responses may pass non-posted commands; and non-posted commands may pass responses. Moreover, non-posted commands without data are allowed to pass non-posted commands with data.

These ordering rules are handled in the technique of the embodiments by providing one command storage unit 320–370 for storing commands of all types in the order the commands were received. The first commands of each type may be individually addressed to be read out of the storage and transmitted to the recipient. The selection of the respective command is done by the ordering rule controller 300 that fulfils the above mentioned ordering rules.

As apparent from FIG. 3 the ordering rule controller 300 receives buffer availability signals that inform the ordering rule controller 300 of the fact that the recipient does or does not have sufficient buffer space to receive and buffer the command. These buffer availability signals comprise a no posted command buffer signal, a no non-posted command buffer signal, a no non-posted data buffer signal, and a no response buffer signal. If for example no response buffer is presently available at the recipient, the ordering rule controller 300 will refrain from controlling the multiplexer 310 to select the first response. Rather, the ordering rule controller 300 will determine the next command in the storage that has a different command type and that may be selected without violating the ordering rules.

The following is an example of how to operate the embodiment of FIG. 3. The ordering rule controller 300 will first try to issue the first command, i.e., the command stored in element 320. In the present case, this command is a response. If no response buffer is available at the recipient, the ordering rule controller 300 would then evaluate each of the remaining command types one after the other, starting with the upper most command that is not a response. In the present case, this would be a non-posted command with data that is stored in storage element 330.

Transmitting a non-posted command with data requires both, a command buffer and a data buffer at the recipient's side. If at that moment, the recipient has a command buffer available but no data buffer, the ordering rule controller 300 will refrain from selecting the command stored in element 330 but will step to element 340 instead. In this element, a non-posted command without data is stored, and since this command does not require a free data buffer at the recipient, the ordering rule controller 300 has now found a command that may be transmitted. Since non-posted commands without data may pass non-posted commands with data, and since non-posted commands may pass responses, the command stored in element 340 may indeed be selected without violating the ordering rules. Thus, this command would be chosen to be transmitted in the present case.

If the recipient would however not even have buffer space available to store non-posted data, the ordering rule controller 300 would step over to element 350 to check whether the command stored in that storage element can be buffered at the recipient's side and whether it is allowed to pass the other commands.

Figure 4:
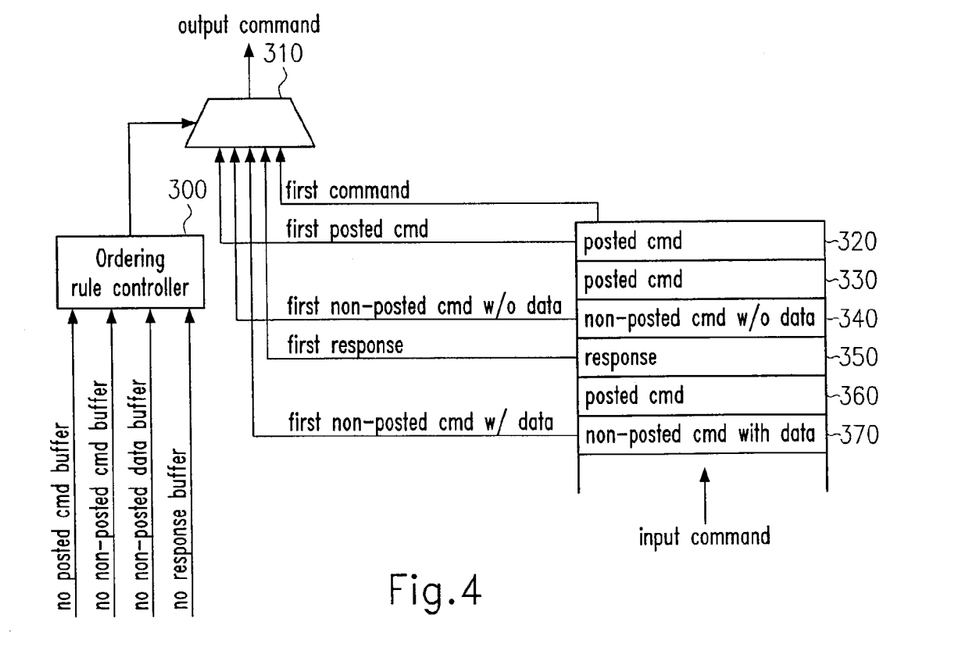
FIG. 4 illustrates a command queue mechanism according to another embodiment.

Turning now to FIG. 4 another embodiment is shown that resembles that of FIG. 3 but differs in the order of the stored commands. In the example of FIG. 4, the first command is a posted command, and the sequence of the following commands differs from that of FIG. 3. This means that the first posted command is now that stored in element 320 while it was element 350 in FIG. 3. Similar changes apply to the first response, first non-posted command with data, and first non-posted command without data.

Taking the embodiment of FIG. 4, it is to be noted that the ordering rule controller 300 would however stick to storage element 320 since this element stores a posted command. As mentioned above, neither posted nor non-posted commands nor responses may pass a posted command. Thus, if there is no buffer space at the recipient to store the posted command, the ordering rule controller 300 would not check the commands stored in the following storage elements 330–370 since these commands could not be selected without violating the command ordering rules.

As apparent from FIGS. 3 and 4 and the above description of the embodiments, a data storage unit 320–370 is provided that stores the incoming commands in the order they were received. In case the recipient does have sufficient buffer space to satisfy all requirements with respect to each command type, the ordering rule controller 300 would always control the multiplexer 310 to select the first command, i.e., the command stored in storage element 320, irrespective of its command type. Thus, the command storage unit 320–370 would then operate as a FIFO (First In First Out) buffer.

Figure 5:
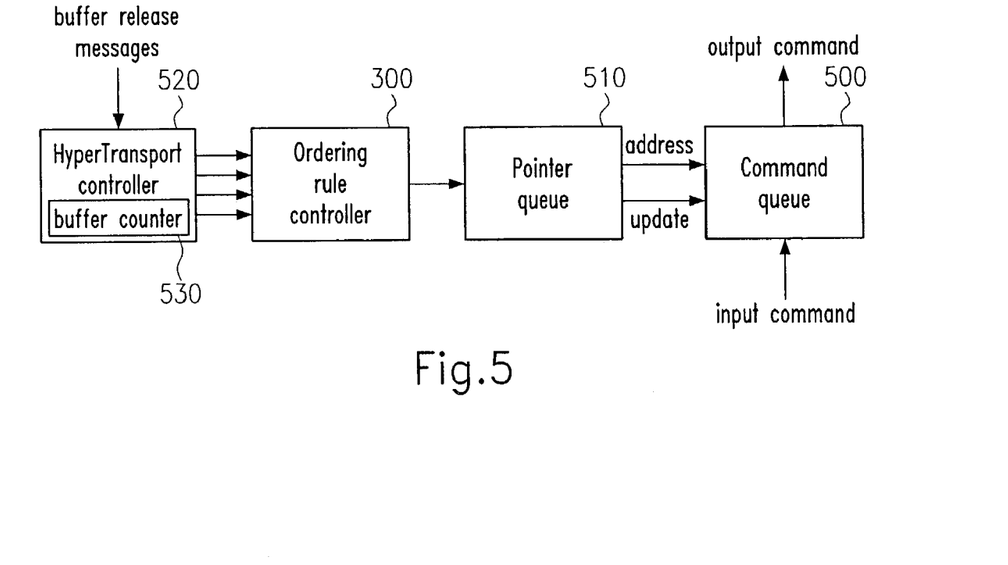
FIG. 5 is a block diagram illustrating the components of a southbridge device according to an embodiment.

Turning now to FIG. 5, a block diagram of the components within a southbridge device are shown to implement the technique of the above embodiments. The command storage unit 320–370 of FIGS. 3 and 4 corresponds to the command queue 500 and the pointer queue 510 of FIG. 5. The command queue 500 receives the incoming commands, stores the commands in the order they were received, and outputs the command that is selected by the ordering rule controller 300. The pointer queue 510 stores pointers to the first command, the first response, the first posted command, the first non-posted command without data, and the first non-posted command with data. Using these pointers, the pointer queue 510 may be used to address the respective storage elements in the command queue 500. Moreover, the pointer queue 510 may send a signal to the command queue 500 to update the command queue 500 once a command is transmitted.

The ordering rule controller 300 that instructs the pointer queue 510 to address the next command that fulfils the ordering rules, receives the above described buffer availability signals from the HyperTransport controller 520. The HyperTransport controller 520 receives buffer release messages from the potential recipient(s) of the commands. The buffer release messages inform the HyperTransport controller 520 on the number of available buffers, i.e., the free buffer space.

The HyperTransport controller 520 of the present embodiment comprises a buffer counter 530 for each command type. The buffer counter 530 stores a count value that is increased each time a buffer release message is received indicating that a buffer at the recipient was freed. Moreover, each time a command is transmitted, the HyperTransport controller 520 decreases the respective buffer counter, assuming that the transmitted command will occupy a buffer. If that buffer is then made available again, for instance by having the command processed by the recipient, a further buffer release message is sent to the HyperTransport controller 520. That is, the HyperTransport controller may decrease the buffer counter 530 with each respective command being transmitted, and may automatically increase the buffer counter based on the received buffer released messages.

Figure 6:
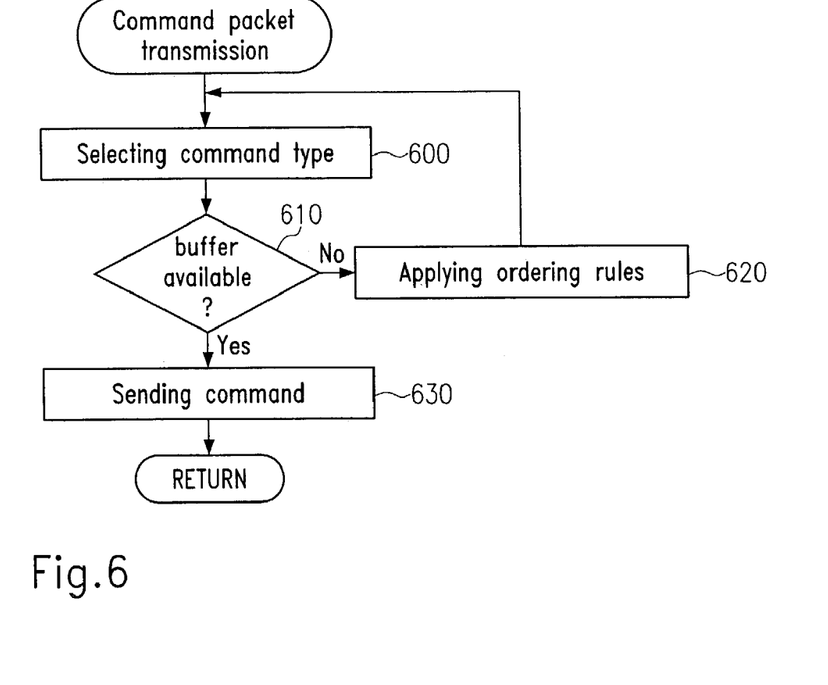
FIG. 6 is a flowchart illustrating the process of transmitting command packets according to an embodiment.

Turning now to FIG. 6 which is a flowchart illustrating the process of transmitting command packets, the ordering rule controller 300 selects a next command type in step 600 if the command stored in the upper most storage element 320 cannot be transmitted. It is then checked in step 610 whether buffer space needed for the selected command type is available. If so, the ordering rule controller 300 controls the storage unit to output the respective first command of the selected command type (step 630). If however no buffer space is available, the ordering rule controller 300 applies the ordering rules in step 620 to determine whether command types exist that may pass the earlier commands, and the process then returns to step 600.

It is to be noted that the flowchart of FIG. 6 is given for explanatory reasons only, and any other sequence of method steps that would be suitable to operate the embodiments of FIGS. 3 to 5 may be used instead. For instance, step 620 or a similar step may also be located between steps 610 and 630.

The above embodiments have been described in the context of operating a southbridge device. In this embodiment, the input commands may come from peripheral component controllers such as those shown in FIG. 2. In this example, the selected commands would be transmitted upstream. It is however to be noted that other embodiments may exist where the input commands are received downstream, and the selected commands are also transmitted downstream.

Moreover, it is to be mentioned that other embodiments exist that do not relate to southbridges in computer systems. In these embodiments, the circuits of FIGS. 3 to 5 may be comprised in an integrated circuit chip that receives commands of different command types and that is required to transmit only those commands that fulfil certain ordering rules that are command type dependent.

Furthermore, it is to be noted that the above embodiments may be used in the context of the HyperTransport technology, but are not restricted thereto.

The above embodiments are advantageous since there is only one storage unit 320–370, 500, 510 needed to store commands of all command types in a unified manner. This improves efficiency and increases the operation speed.

Moreover, this is advantageous since it overcomes the problems of the prior art discussed above. In particular, the embodiments allow for a compact implementation of the ordering rules since all of the commands and data can be held in one storage. This increases the design robustness and simplifies the verification. The implementation of the embodiments may have a FIFO like command storage that comprises a control unit that has some logic circuits and flip flops, and stores pointers to a RAM (Random Access Memory) module. The storage further comprises the RAM module that holds the complete commands and the associated data.

While the invention has been described with respect to the physical embodiments constructed in accordance therewith, it will be apparent to those skilled in the art that various modifications, variations and improvements of the present invention may be made in the light of the above teachings and within the purview of the appended claims without departing from the spirit and intended scope of the invention. In addition, those areas in which it is believed that those of ordinary skill in the art are familiar, have not been described herein in order to not unnecessarily obscure the invention described herein. Accordingly, it is to be understood that the invention is not to be limited by the specific illustrative embodiments, but only by the scope of the appended claims.

What is claimed is:

1. A southbridge device having a command transmit engine adapted to transmit commands of different command types, said command transmit engine comprising:

a command storage unit adapted to receive incoming commands of different command types and store said commands in a single command queue in a sequence of storage elements corresponding to the order in which the commands were received, said command storage unit comprising the command queue and further comprising a pointer queue adapted to store pointers to selected queue items of said command queue, said pointers being used to address said queue items in said command queue; and an ordering rule controller connected to said command storage unit to select stored commands to be transmitted, said ordering rule controller being adapted to perform the selection according to predefined command ordering rules, said command ordering rules being command type dependent.

2. The southbridge device of claim 1, wherein said pointer queue stores a pointer for each command type, each of said pointers pointing to the queue item in said command queue where an earliest command of the respective command type is stored.

3. The southbridge device of claim 1, wherein said pointer queue stores a pointer to the queue item holding an earliest posted command, a pointer to the queue item holding an earliest non-posted command with data, a pointer to the queue item holding an earliest non-posted command without data, and a pointer to the queue item holding an earliest response.

4. The southbridge device of claim 1, wherein said command queue stores said commands in the order in which the commands were received.

5. The southbridge device of claim 1, wherein said command queue stores said commands out-of-order whereas said pointer queue stores said pointers in the order in which the commands were received.

6. The southbridge device of claim 1, wherein said ordering rule controller is adapted to perform said selection dependent on the availability of free buffer space at the recipient of the respective command.

7. The southbridge device of claim 6, wherein said ordering rule controller is adapted to perform said selection so as to operate said command storage unit in a first-in-first-out manner.

8. The southbridge device of claim 6, wherein said ordering rule controller is connected to receive command type dependent signals indicating said availability.

9. The southbridge device of claim 8, wherein said command type dependent signals comprise a signal indicating the availability of free buffer space for a posted command, a signal indicating the availability of free buffer space for a non-posted command, and a signal indicating the availability of free buffer space for a response.

10. The southbridge device of claim 9, wherein said command type dependent signals further comprise a signal indicating the availability of free buffer space for non-posted data.

11. The southbridge device of claim 8, further comprising an interface controller connected to said ordering rule controller to generate said command type dependent signals based on buffer release messages received from said recipient, and provide the generated signals to said ordering rule controller.

12. The southbridge device of claim 11, wherein said interface controller comprises at least one buffer counter storing a count value indicative of the amount of free buffer space at said recipient, wherein said interface controller is adapted to update said at least one buffer counter based on said buffer release messages.

13. The southbridge device of claim 12, wherein said at least one buffer counter comprises a specific buffer counter for each command type.

14. The southbridge device of claim 12, wherein said at least one buffer counter comprises a buffer counter related to posted commands, a buffer counter related to non-posted commands, a buffer counter related to non-posted data, and a buffer counter related to responses.

15. The southbridge device of claim 12, wherein said interface controller is further adapted to update said at least one buffer counter also when a command is transmitted.

16. The southbridge device of claim 11, wherein said interface controller is a HyperTransport interface controller.

17. The southbridge device of claim 6, wherein said buffer space is for buffering a command.

18. The southbridge device of claim 17, wherein said buffer space is further for buffering command-type specific data.

19. The southbridge device of claim 1, wherein said command types comprise posted commands, non-posted commands, and responses.

20. The southbridge device of claim 19, wherein said command types distinguish between non-posted commands with data and non-posted commands without data.

21. The southbridge device of claim 20, wherein said command ordering rules define that non-posted commands without data are allowed to pass non-posted commands with data.

22. The southbridge device of claim 19, wherein said command ordering rules define that posted commands are allowed to pass non-posted commands.

23. The southbridge device of claim 19, wherein said command ordering rules define that posted commands are allowed to pass responses.

24. The southbridge device of claim 19, wherein said command ordering rules define that responses are allowed to pass non-posted commands.

25. The southbridge device of claim 19, wherein said command ordering rules define that non-posted commands are allowed to pass responses.

26. The southbridge device of claim 19, wherein said command ordering rules define that no command is allowed to pass posted commands.

27. The southbridge device of claim 1, further comprising a data decoder, wherein said ordering rule controller is comprised in said data decoder.

28. The southbridge device of claim 1, wherein said command transmit engine is adapted to transmit said commands over a HyperTransport link.

29. An integrated circuit chip comprising:
   a command storage circuit adapted to receive incoming commands of different command types and store said commands in a single command queue in a sequence of storage elements corresponding to the order in which the commands were received, said command storage unit comprising the command queue and further comprising a pointer queue adapted to store pointers to selected queue items of said command queue, said pointers being used to address said queue items in said command queue; and
   an ordering rule control circuit connected to said command storage circuit to select stored commands to be output, said ordering rule control circuit being adapted to perform the selection according to predefined command ordering rules, said command ordering rules being command type dependent.

30. A computer system comprising:
   at least one peripheral component; and
   a southbridge having a command transmit engine adapted to transmit commands of different command types, said command transmit engine comprising:
   a command storage unit adapted to receive incoming commands of different command types from at least one control unit of said at least one peripheral component, said command storage unit storing said commands in a single command queue in a sequence of storage elements corresponding to the order in which the commands were received, said command storage unit comprising the command queue and further comprising a pointer queue adapted to store pointers to selected queue items of said command queue, said pointers being used to address said queue items in said command queue; and an ordering rule controller connected to said command storage unit to select stored commands to be transmitted, said ordering rule controller being adapted to perform the selection according to predefined command ordering rules, said command ordering rules being command type dependent.

31. A method of operating a southbridge device, the method comprising:

receiving commands of different command types;

storing said commands in a single queue in a sequence of storage elements corresponding to the order in which the commands were received, wherein said storing commands comprises storing said commands in a single command queue;

storing, in a pointer queue, pointers to selected queue items of said command queue, said pointers being used to address said queue items in said command queue;

selecting stored commands to be transmitted, by applying predefined command ordering rules, said command ordering rules being command type dependent; and transmitting the selected commands.

32. The method of claim 31, wherein said step of storing pointers comprises:

storing a pointer for each command type, each of said pointers pointing to the queue item in said command queue where an earliest command of the respective command type is stored.

33. The method of claim 31, wherein said step of storing pointers comprises:

storing a pointer to the queue item holding an earliest posted command, a pointer to the queue item holding an earliest non-posted command with data, a pointer to the queue item holding an earliest non-posted command without data, and a pointer to the queue item holding an earliest response.

34. The method of claim 31, wherein said commands are stored in said command queue in the order in which the commands were received.

35. The method of claim 31, wherein said commands are stored in said command queue out-of-order whereas said pointers are stored in said pointer queue in the order in which the commands were received.

36. The method of claim 31, wherein said step of selecting stored commands is performed dependent on the availability of free buffer space at the recipient of the respective command.

37. The method of claim 36, wherein said step of selecting stored commands is performed so as to achieve a first-in-first-out type command storage.

38. The method of claim 36, wherein said step of selecting stored commands comprises: receiving command type dependent signals indicating said availability.

39. The method of claim 38, wherein said command type dependent signals comprise a signal indicating the availability of free buffer space for a posted command, a signal indicating the availability of free buffer space for a non-posted command, and a signal indicating the availability of free buffer space for a response.

40. The method of claim 39, wherein said command type dependent signals further comprise a signal indicating the availability of free buffer space for non-posted data.

41. The method of claim 38, wherein said step of selecting stored commands comprises:

generating said command type dependent signals based on buffer release messages received from said recipient.

42. The method of claim 41, wherein generating said command type dependent signals comprises:

storing at least one buffer count value indicative of the amount of free buffer space at said recipient, and updating said at least one buffer count value based on said buffer release messages.

43. The method of claim 42, wherein said at least one buffer count value comprises a specific buffer count value for each command type.

44. The method of claim 42, wherein said at least one buffer count value comprises a buffer count value related to posted commands, a buffer count value related to non-posted commands, a buffer count value related to non-posted data, and a buffer count value related to responses.

45. The method of claim 42, wherein said at least one buffer count value is also updated when a command is transmitted.

46. The method of claim 38, wherein said buffer space is for buffering a command.

47. The method of claim 46, wherein said buffer space is further for buffering command-type specific data.

48. The method of claim 31, wherein said command types comprise posted commands, non-posted commands, and responses.

49. The method of claim 48, wherein said command types distinguish between non-posted commands with data and non-posted commands without data.

50. The method of claim 49, wherein said command ordering rules define that non-posted commands without data are allowed to pass non-posted commands with data.

51. The method of claim 48, wherein said command ordering rules define that posted commands are allowed to pass non-posted commands.

52. The method of claim 48, wherein said command ordering rules define that posted commands are allowed to pass responses.

53. The method of claim 48, wherein said command ordering rules define that responses are allowed to pass non-posted commands.

54. The method of claim 48, wherein said command ordering rules define that non-posted commands are allowed to pass responses.

55. The method of claim 48, wherein said command ordering rules define that no command is allowed to pass posted commands.

56. The method of claim 31, wherein said step of selecting stored commands is performed by a data decoder of said southbridge device.

57. The method of claim 31, wherein the selected commands are transmitted over a HyperTransport link.

* * * * *